United States Patent [19]
Bakke et al.

[11] Patent Number: 5,682,499
[45] Date of Patent: Oct. 28, 1997

[54] DIRECTORY REBUILD METHOD AND APPARATUS FOR MAINTAINING AND REBUILDING DIRECTORY INFORMATION FOR COMPRESSED DATA ON DIRECT ACCESS STORAGE DEVICE (DASD)

[75] Inventors: Brian Eric Bakke; Michael Joseph Corrigan; Daniel Frank Moertl; Bruce Marshall Walk, all of Rochester, Minn.

[73] Assignee: International Business Machines Corporation, Armonk, N.Y.

[21] Appl. No.: 466,359

[22] Filed: Jun. 6, 1995

[51] Int. Cl.[6] .................................................... G06F 12/00
[52] U.S. Cl. ........................ 395/439; 364/DIG. 1; 364/DIG. 3; 364/248.1; 364/236.2; 395/427; 395/441; 395/182.04
[58] Field of Search ................. 364/DIG. 1, DIG. 2, 364/248.1, 236.2; 395/427, 439, 441, 182.04, 438

[56] References Cited

U.S. PATENT DOCUMENTS

| | | |
|---|---|---|
| 4,499,539 | 2/1985 | Vosacek . |
| 4,791,623 | 12/1988 | Deiotte ................................ 369/59 |
| 5,021,946 | 6/1991 | Korty . |
| 5,237,675 | 8/1993 | Hannon, Jr. ........................ 395/888 |
| 5,239,640 | 8/1993 | Froemke et al. ................... 395/180 |
| 5,241,672 | 8/1993 | Slomcenski et al. . |
| 5,247,638 | 9/1993 | O'Brien et al. .................... 395/888 |
| 5,305,795 | 4/1994 | Chu ...................................... 369/30 |
| 5,325,347 | 6/1994 | Sako . |
| 5,390,315 | 2/1995 | Blandy et al. . |
| 5,394,534 | 2/1995 | Kulakowski ....................... 395/419 |
| 5,405,644 | 4/1995 | Schneider et al. ................ 395/575 |
| 5,442,752 | 8/1995 | Stycznski .......................... 395/404 |
| 5,490,260 | 2/1996 | Miller et al. ....................... 395/427 |
| 5,537,658 | 7/1996 | Bakke et al. ...................... 395/888 |

OTHER PUBLICATIONS

Brodie et al. Pat. Appln. S.N. 08/343,316 filed Nov. 22, 1994—Method and Means for Managing Linear Mapped Address Spaces Storing Compressed Data at the Storage Subsystem Control Unit or Device Level.

*Primary Examiner*—Tod R. Swann
*Assistant Examiner*—Tuan Thai
*Attorney, Agent, or Firm*—Mason Kolehmainen Rathburn And Wyss

[57] ABSTRACT

A method and apparatus for maintaining and rebuilding directory information for compressed data on a direct access storage device are provided. A directory of DASD compressed data is stored in the storage controller and directory information is periodically written to the DASD for compressed data written to the DASD. A drive write count (DWC) of each write operation to the DASD is maintained. A number of sectors in a compressed data page is identified for the drive write count. A sector sequence number is identified for each of the number of sectors in the compressed data page. A span for the compressed data page is identified for the drive write count. A page offset is identified for the identified number of sectors in the compressed data page. A deallocation status of a first page of an extent is identified. The extent is a block of sequential compressed data pages. Compressed data is written to the DASD with a compression sector header including the drive write, the identified number of sectors, the identified write length indicator, the identified page offset, the identified span, and the identified deallocation status. Directory recovery is performed by reading compressed data from the DASD and utilizing the compression sector header to enable reclamation of valid sequences of DASD sectors into compressed pages.

11 Claims, 9 Drawing Sheets

| | DRIVE WRITE COUNT 4-35 | | | | |
|---|---|---|---|---|---|
| HDR0 | | | | | |
| HDR1 | X'1x' | X'00' | X'00' | X'CE' | |
| X'000' | AAAALLLL | AAAALLLL | AAAALLLL | AAAALLLL | ← PAGE ENTRIES 80 |
| X'004' | AAAALLLL | AAAALLLL | AAAALLLL | AAAALLLL | |
| | *** | *** | *** | *** | |
| X'0F8' | AAAALLLL | AAAALLLL | AAAALLLL | AAAALLLL | |
| X'0FC' | AAAALLLL | AAAALLLL | AAAALLLL | AAAALLLL | |
| X'100' | llll llll | llll llll | llll llll | llll llll | |
| X'104' | llll llll | llll llll | llll llll | llll llll | ← EXCEPTION REGION 82 ENTRIES |
| | *** | *** | *** | *** | |
| X'17C' | llll llll | llll llll | llll llll | llll llll | |
| X'180' | EXCEPTION REGION USED BIT MAP BYTES 0-3 | | | | |
| X'184' | EXCEPTION REGION USED BIT MAP BYTES 4-7 | | | | |
| X'188' | EXCEPTON REGION USED BIT MAP BYTES 8-11 | | | | |
| X'18C' | EXCEPTION REGION USED BIT MAP BYTES 12-15 | | | | |
| X'190' | DATA AREA AAAA COUNT | | DATA AREA LLLL COUNT | | COMPRESSION ← GROUP 84 STATISTICS |
| X'194' | HOST PAGE ADDRESS 0-20 | | B'000' | ER L CNT | |
| X'198' | PAGE WRITTEN COUNT | | ssss ssss | FLAGS | |
| X'19C' | cccc cccc | cccc cccc | cccc cccc | cccc cccc | ← CHECK-FIELD 86 |
| X'1A0' | rrrr rrrr | rrrr rrrr | rrrr rrrr | rrrr rrrr | |
| | *** | *** | *** | *** | |
| X'1FC' | rrrr rrrr | rrrr rrrr | rrrr rrrr | rrrr rrrr | ← RESERVED/UNUSED |

MICRO TABLE 44    FIG.2

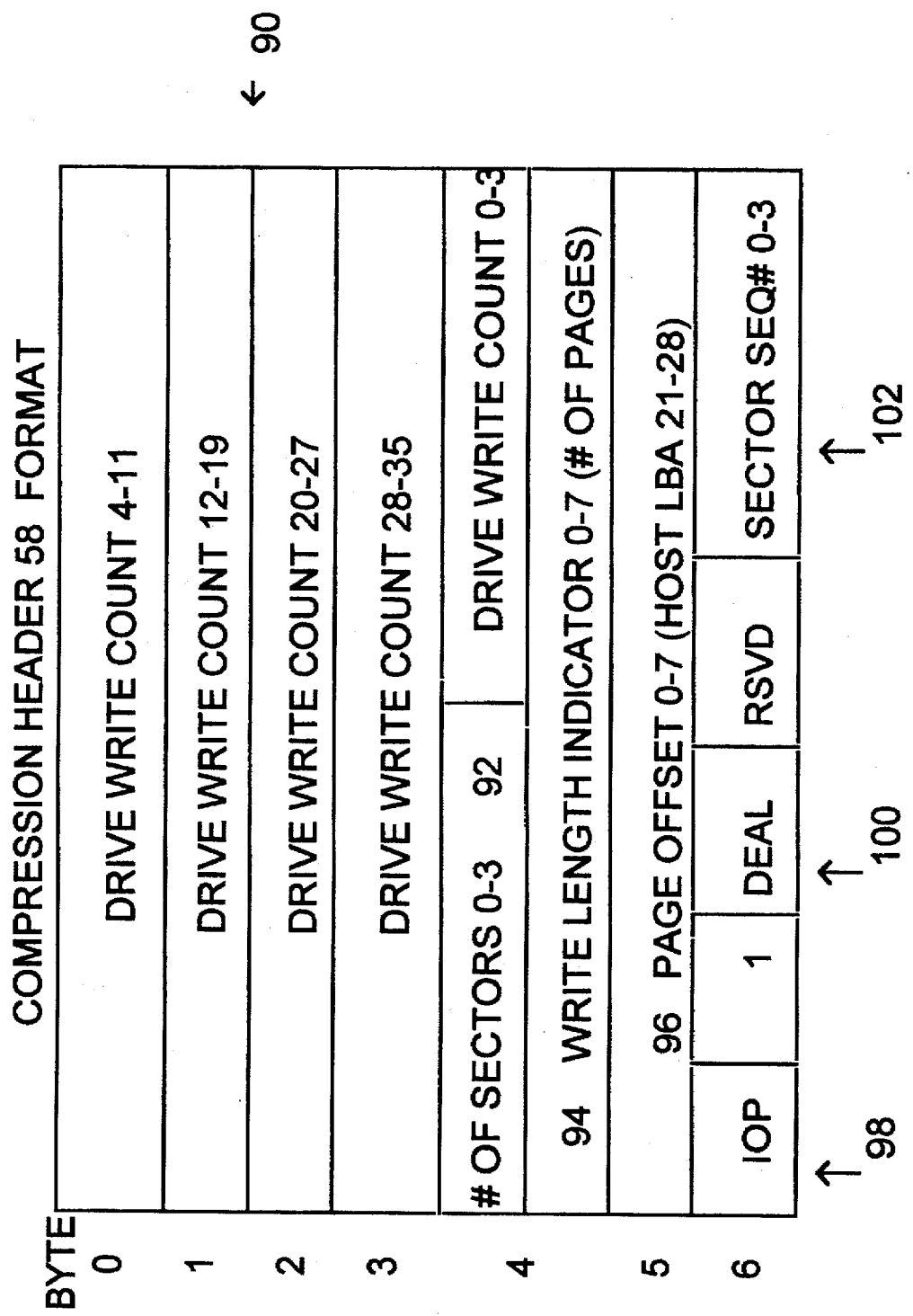

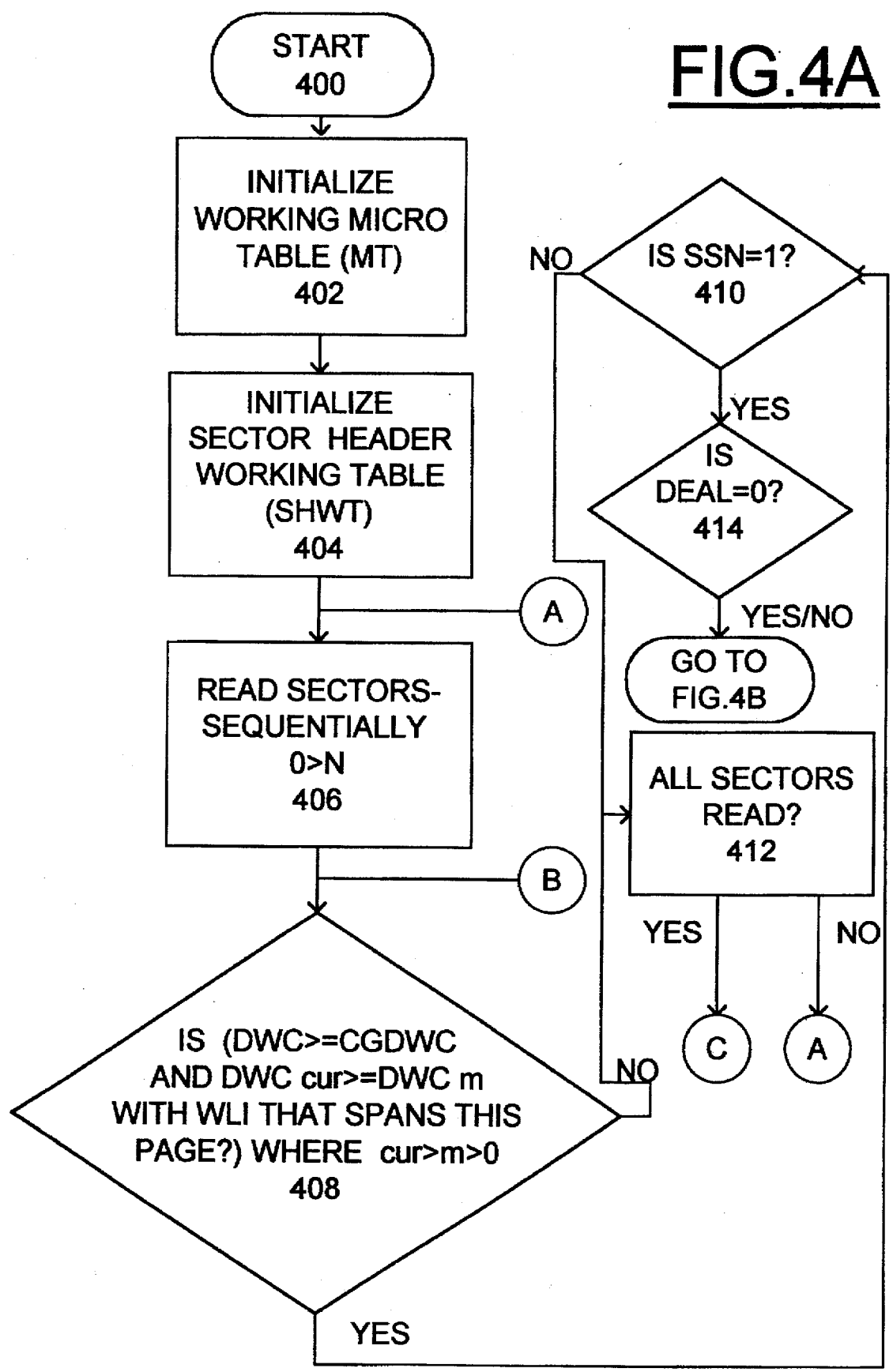

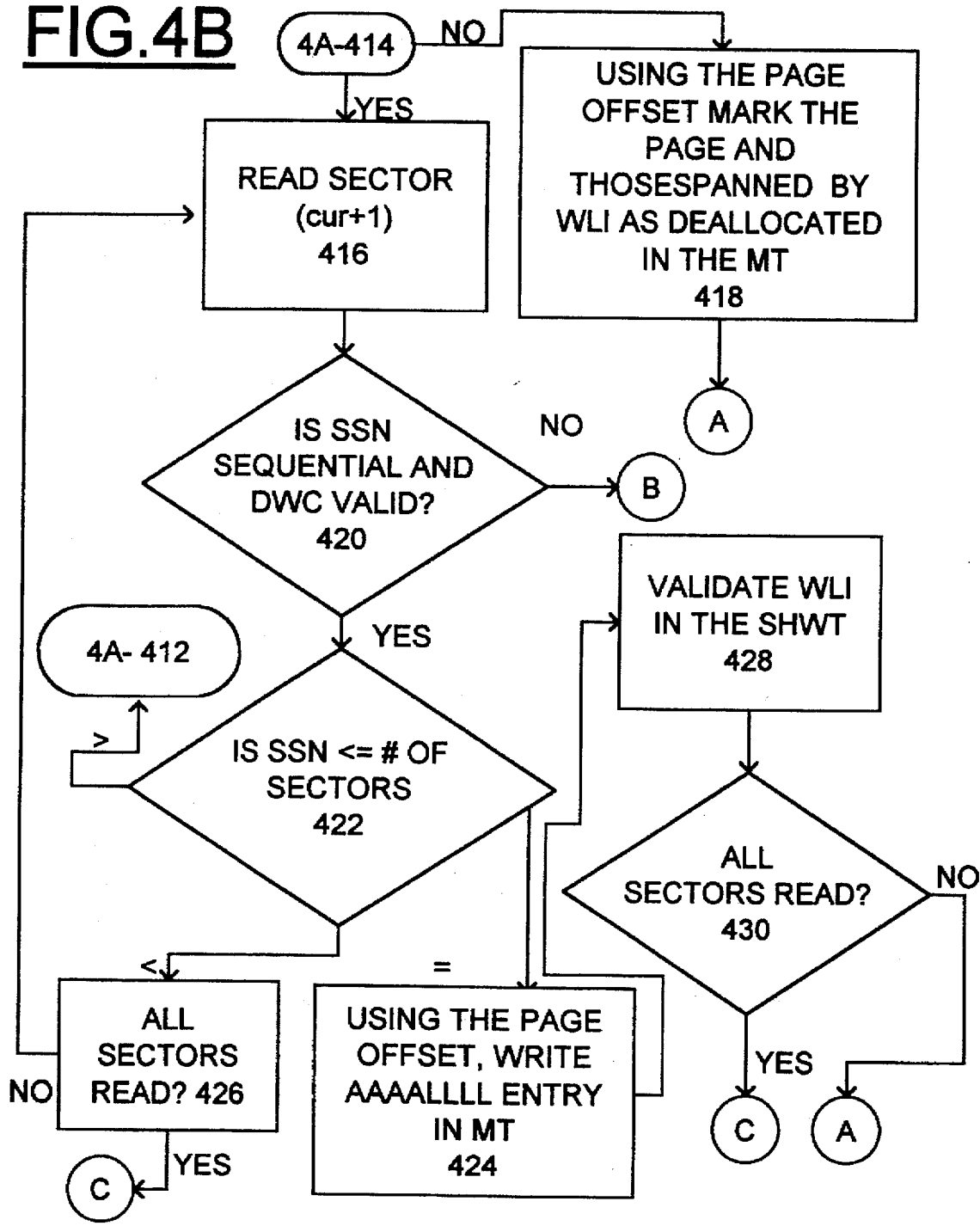

| SECTOR INDEX | PAGE OFFSET | AAAA LLLL (PER PAGE) | DWC | WLI | # OF SECTORS | SECTOR SEQUENCE # | DEAL |
|---|---|---|---|---|---|---|---|
| DATA AREA | | | | | | | |
| 0 | 0 | aaaa llll | xxx....xxx | xxx....xxx | xxx....xxx | xxx....xxx | xxx....xxx |
| 1 | | | | | | | |
| 2 | | | | | | | |
| 3 | | | | | | | |
| N-1 | M-1 | | | | | | |
| EXCEPTION AREA | | | | | | | |
| 0 | | llll llll | xxx....xxx | xxx....xxx | xxx....xxx | xxx....xxx | xxx....xxx |
| | | llll llll | | | | | |
| P-1 | | | | | | | |

FIG. 6

DIRECTORY REBUILD METHOD AND APPARATUS FOR MAINTAINING AND REBUILDING DIRECTORY INFORMATION FOR COMPRESSED DATA ON DIRECT ACCESS STORAGE DEVICE (DASD)

FIELD OF THE INVENTION

The present invention relates to method and apparatus for maintaining and rebuilding directory information for compressed data on a direct access storage device (DASD).

DESCRIPTION OF THE PRIOR ART

Computers often include auxiliary memory storage units having media on which data can be written and from which data can be read. Disk drive units or DASDs, often incorporating stacked, commonly rotated rigid magnetic disks, are used for storage of data in magnetic form on the disk surfaces. Data is recorded in radially spaced data information tracks arrayed on the surfaces of the disks. Transducer heads driven in a path toward and away from the drive axis write data to the disks and read data from the disks. A data cylinder includes a set of corresponding data information tracks for the stack of disk surfaces. In a DASD using fixed block architecture (FBA), the data information tracks are divided into equally sized segments or sectors. Each sector is assigned a number or logical block address (LBA). Typically, a data file is written and read using consecutive LBA's, trackfollowing on the data information tracks of successive consecutive logical data surfaces from the starting LBA. Fragmentation occurs when blocks of data from the file are written to available discontinuous sectors at different locations on the DASD.

To utilize the relatively limited amount of the available data storage capacity of DASDs, data may be stored by a compression technique. However to effectively utilize DASDs, response time should be both predictable and fast. Response time consistency is an extremely important consideration. In cases of heavy work load, response time must at least be predictable. For batch operations, businesses typically rely on certain windows of low system load to run background applications. If time requirements for these applications are not consistent and predictable, it becomes difficult to schedule the work flow, potentially resulting in windows of time where the system is heavily overloaded.

Storage subsystem based compression solutions for DASDs must provide for a mapping of data from the host system logical address to the physical location where the data is written or a DASD physical address or LBA. The storage subsystem must maintain some type of directory that preserves this mapping over time and between system power cycles.

One approach is to maintain a directory on the DASD and continually update it while operating. In addition, a mirror directory can be maintained to prevent directory loss due to single sector read errors. This approach would likely result in a significant, and unacceptable, performance impact.

A second approach is to maintain a copy of the directory on the controller in non-volatile memory. This can alleviate the majority of the performance problems resulting from the first approach; however, the cost of a non-volatile memory array is high. Similarly, frequently used portions of the directory can be cached in non-volatile memory. This lowers the size requirement but does not alleviate the fundamental cost issue.

A third approach is to encode sufficient information along with the system data to be written such that directory information can be recreated if required. Then the directory can be cached in controller memory using a low-cost volatile dynamic random access memory (DRAM). The directory would also be stored non-volatily to the DASD, but only written prior to machine power cycles or on cache full conditions. In the event of an unexpected power cycle, the directory can be recovered from the system data written to DASD. This directory approach provides a mechanism that minimizes cost impacts while maintaining performance.

Data Compression, however, adds another significant dimension to this problem of maintaining a directory. Applying compression to a block of data yields a data block of different size, usually but not always, smaller than the original. Data compression ratios will vary across data types. Similarly, as data is updated, the compression ratio can change. As the compression ratio of data within each page changes, fragments of "old" data remain on the DASD unless DASD operations are generated to zero these data fragments.

From a more global media perspective, this variation in data size generally dictates that the storage subsystem perform a background operation that ensures that data blocks are stored efficiently. Typically this involves eliminating fragmentation by collecting free space into large, usable blocks. The variation in data size with compression as well as the need to move large blocks of data clearly leave a substantial amount of "old" data on the device.

If the techniques used today in some known storage subsystems without data compression, such as in an IBM AS/400, were used, it would be necessary to ensure that only one copy of any given page exists on the DASD at one time. This implies that old data, either a page or any sector containing a portion of a compressed page, would have to be cleared. This act in itself would generate a significant amount of controller generated operations to the device. Further, the synchronization of the write of new data and zeroing of "old" data adds complexity in order to ensure data integrity in the face of real world problems such as power outages, hardware failures, and code "hangs".

When dealing with a fixed block system logical domain that is subjected to data compression, a new variable block storage controller physical domain is created. When this variable block size domain is stored on a fixed block device, such as a DASD, new techniques must be created to enable directory recovery while maintaining subsystem performance. It is also essential for data integrity reasons, that the recreated directory faithfully represent the data as reflected by operation completion status from the controller back to the system.

SUMMARY OF THE INVENTION

Important objects of the present invention are to provide an improved method and apparatus for maintaining and rebuilding directory information for compressed data on a direct access storage device(DASD); to provide such method and apparatus that allows for the caching of directory information volatily in a storage controller while encoding sufficient information along with the data written during system operations for directory recovery; to provide such method and apparatus that minimizes and/or eliminates controller generated directory device operations, especially those that must occur synchronously in conjunction with system initiated read and writes; and to provide such method and apparatus that overcome many of the disadvantages of prior art arrangements.

In brief, method and apparatus for maintaining and rebuilding directory information for compressed data on a direct access storage device are provided. A directory of DASD compressed data is stored in the storage controller and directory information is periodically written to the DASD for compressed data written to the DASD. A drive write count (DWC) of each write operation to the DASD is maintained. A number of sectors in a compressed data page is identified for the drive write count. A sector sequence number is identified for each of the number of sectors in the compressed data page. A span for the compressed data page is identified for the drive write count. A page offset is identified for the identified number of sectors in the compressed data page. A deallocation status of a first page of an extent is identified. The extent is a block of sequential compressed data pages. Compressed data is written to the DASD with a compression sector header including the drive write, the identified number of sectors, the identified write length indicator, the identified page offset, the identified span, and the identified deallocation status. Directory recovery is performed by reading compressed data from the DASD and utilizing the compression sector header to enable reclamation of valid sequences of DASD sectors into compressed pages.

BRIEF OF THE DRAWINGS

The present invention together with the above and other objects and advantages may best be understood from the following detailed description of the preferred embodiments of the invention illustrated in the drawings, wherein:

FIG. 2 is a block diagram illustrating a micro table directory of a compression group for the DASD compression system of FIG. 1 in accordance with the present invention;

FIG. 3 is a block diagram illustrating a data compression header format of the DASD compression system implementing a data compression structure of FIGS. 1 and 1A in accordance with the present invention;

Figure 1:
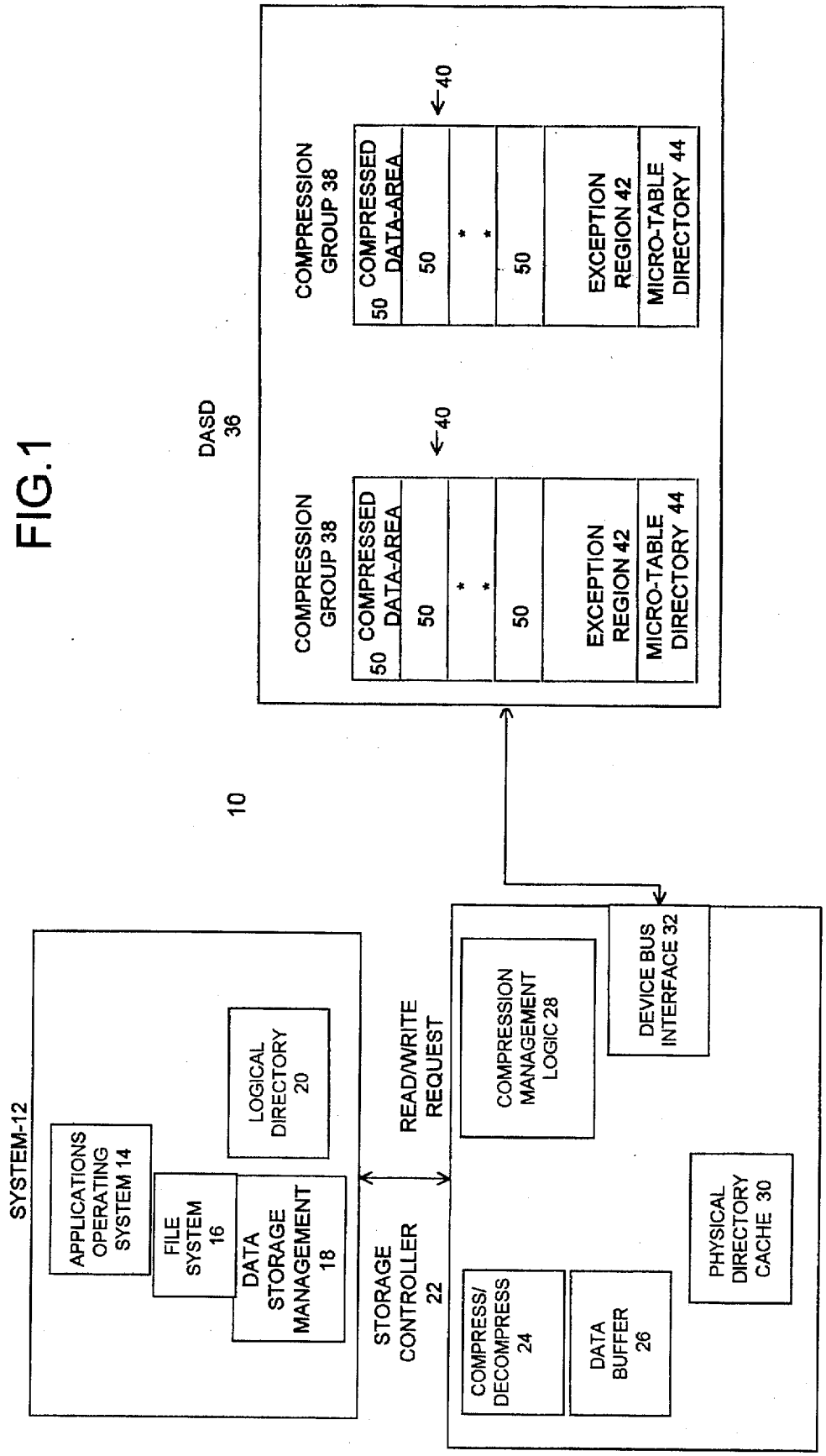
FIG. 1 is a block diagram illustrating a system employing a storage controller for implementing integrated direct access storage device (DASD) compression and a data compression structure in accordance with the present invention.

FIGS. 4A, 4B, 5A and 5B together provide a flow chart illustrating logical steps performed by a storage controller of FIG. 1 for rebuilding directory information for compressed data on a direct access storage device (DASD) in accordance with the present invention.

FIG. 6 is a chart illustrating an exemplary sector header working table.

DETAILED DESCRIPTION OF THE PREFERRED EMBODIMENTS

Referring now to the drawings, in FIG. 1 there is illustrated a block diagram representation of an exemplary system generally designated by 10 for performing a data compression method of the invention. As illustrated, the exemplary system 10 includes a data processing or host system generally designated by 12. Host system 12 includes an application operating system 14, a file system 16 and a direct access storage device (DASD) data storage management function 18 used to store data onto at least one DASD 36. DASD storage management function 18 includes a logical directory 20 that stores the logical block addresses where data is placed on the associated DASD or DASDs 36.

Data is accessed on the DASD 36 through a storage controller generally designated by 22 that compresses data when it is written to the DASD and decompresses data when it is read from the DASD. Storage controller 22 includes a compression and decompression functional block 24, a data buffer 26 for storing data, a compression management logic block 28 for performing address translation and a physical directory cache 30 that is used for storing cached directory elements of the DASD directory generated within the storage controller 22. Storage controller 22 receives data pages from the host system 12, compresses it, and creates compressed data pages to be stored in sectors, appending compression headers that enable directory recovery to occur. Once the physical location of data on DASD is determined by the compression management logic 28, compressed data is passed to or received from the DASD 36 via a device bus interface 32.

DASD 36 includes a plurality of variable sized compression groups 38, each compression group is used for storing related host system data. Each compression group includes a compressed data area 40 for storing original and updated compressed data, an exception region 42 for storing updated compressed pages that are larger than their original allocated space and a directory or micro table 44 for locating data within the compression group. The compressed data area 40 consists of multiple compression regions 50. Compressed data is organized on DASD 36 so that the spatial relationships of related data are maintained within each compression group 38, together with necessary space management parameters. The compressed data arrangement provides consistent performance in a commercial environment and minimizes performance impact due to using data compression.

Figure 1A:
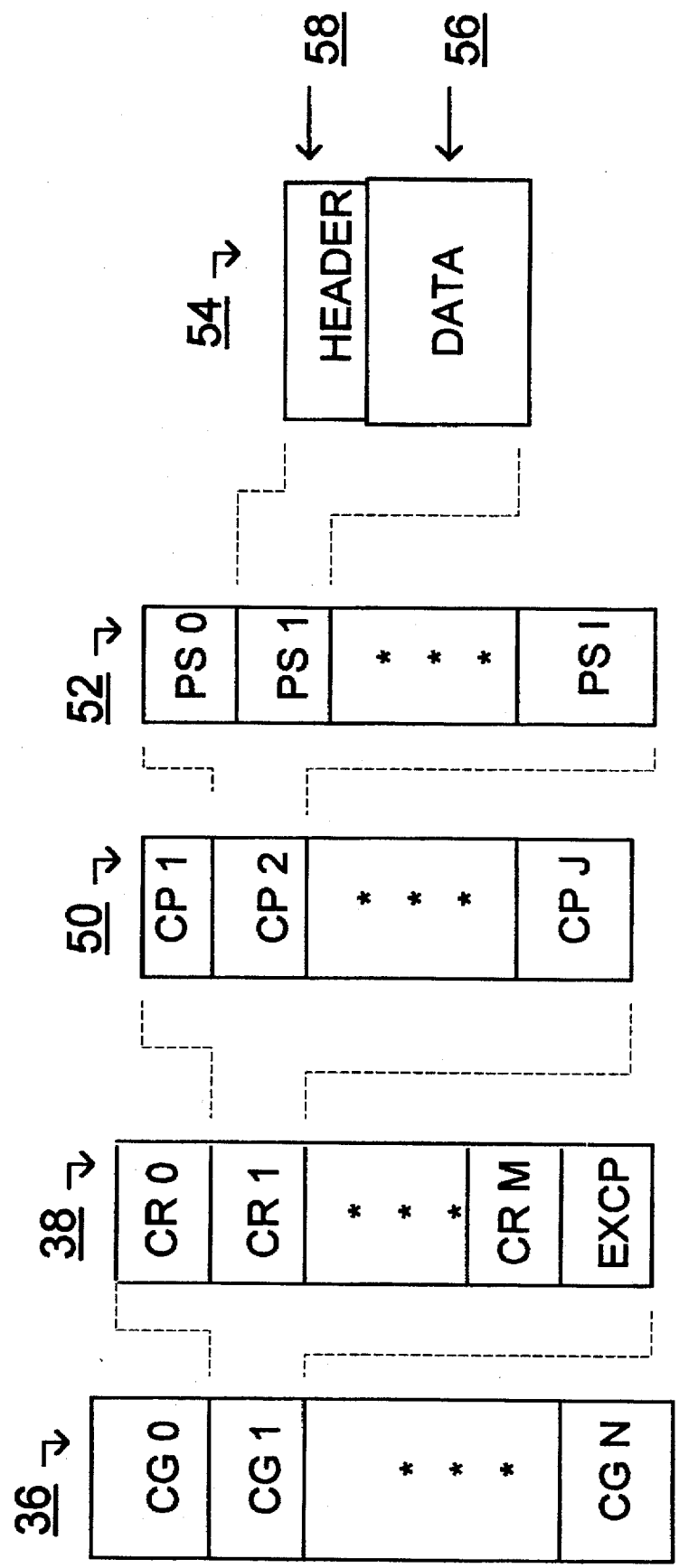
FIG. 1A is a block diagram illustrating a data compression structure in accordance with the present invention.

Having reference now to FIG. 1A, the data compression structure is illustrated. Segmentation of data on DASD is provided into multiple finite blocks or compression groups 38 (CG0 through CG N). Each compression group 38 is managed as an integral unit with space allocated flexibly within it according to a compressed data hierarchy of the invention. Data within each compression group 38 represents a fixed logical address range from the view of host system 12 with variations in physical size depending on the compression characteristics of the stored data. A compression group 38 is not limited to any particular size; however, data storage efficiencies are realized when the compression group size is chosen to be as large or larger than the majority of data blocks that the host system 12 allocates. It should also be relatively large with respect to the system page size. The compression group size is chosen to generally match file system storage management allocation and access patterns. For an IBM AS/400 computer system 12, the compression group size has been selected to be 1 MB with a system page size of 4K. Within the compression group 38, data is stored sequentially in the order dictated by the system addressing model. Each system data page is compressed individually within the group and stored in the physical space equivalent to its compressed size. There is no requirement that compression groups 38 maintain any spatial relationship with respect to one another.

Each compression group 38 consists of a variable number of compression regions 50, and is therefore variable in terms of physical size. As shown, each compression group 38 physically comprises an integral number of compression regions 50 (CR 0 through CR M). Compression regions 50 are used to provide a convenient granularity for managing disk space. Although any size could be used including a sector, the functionally indivisible, minimum addressable data area on DASD 36, selecting the size of the compression region 50 to match the disk geometry, for example, a track size or other implementation dependent size, is beneficial. The use of compression regions 50 is optional, although it contributes to the realization of efficient implementations.

In FIG. 1A, the exception and administration region (EXCP) includes the exception region 42 and the micro table directory 44. EXCP region is predefined space within the compression group 38 for compressed pages that no longer fit in the space currently allocated for them and directory data. The EXCP region consists of an integral number of compression regions 50. Although the EXCP region does affect the sequential storage of data within a compression group 38, exception region 42 ensures that updated data is not stored far from its original storage space and neighboring file data. In many cases, the use of the small computer system interface (SCSI) Skip Read and Skip Write Commands allow for the acquisition of exception region stored data along with its neighboring pages in a single operation. The SCSI Skip Read and Skip Write Commands utilize a skip mask to set selected sectors to be read or written with other sectors set as zero that are skipped. Even when this cannot be accomplished, a long seek is avoided due to the close proximity of the EXCP region. Directory information to aid in the location of data within each block is kept with the data in each compression group 38 withing the micro table 44 which is part of the EXCP region 44. Similarly, the close proximity of the directory information to its related data minimizes DASD seeks when the directory must be accessed. Directory information also is cached in the storage controller 22, minimizing updates of directory information in the compression group micro table directory 44.

Each compression region 50 includes multiple compression pages 52 (CP 1 to CP J). The size of the compression page 52 advantageously is selected to be equal to the system page size. This eliminates the need for the DASD subsystem controller 22 to perform read-modify-write operations to a compressed page 52 where only a portion of the data has been modified by the host system 12. The compression region 50 consists of a fixed number of physical sectors 54 containing a variable number of compression pages 52. Physical size of compression page 52 is 1 to n physical sectors 54 (PS 0–PS i) dependent on the particular compression ratio. Compression pages 52 may span compression regions 50 within a compression group 38.

The physical sector 54 includes compressed data 56 and a physical sector header 58 arranged in accordance with the invention for control information used for rebuilding directory information. Initially DASD 36 is formatted to the proper sector size to accommodate compression headers 58 with the sector contents initially zeroed.

Referring to FIG. 2, the micro table 44 consists of page entries 80, exception region entries 82, compression group statistics 84, and a check field 86. The Page entries 80 consist of a one byte entry, AAAALLLL for each page; where, AAAA represents the 'allocated' page length in a number of sectors and LLLL represents the 'used' page length in a number of sectors. Pages are stored sequentially in the data area 50. The exception region entries 82 consist of a one byte entry, IIII IIII that represents the compression group page offset (CGPO). The CGPO entry is a page index relative to the start of the compression group indicating the page that has a sector stored in the exception region 42. In the exception region, sectors 54 for a given page must be stored sequentially but are not required to be contiguous. An exception region used bit map field defines a bit map for each sector 54 in the exception region 42 indicating which sectors are occupied by exception pages.

Compression group statistics 84 include a data area AAAA count providing a count of all sectors in the compression group data area 40 that are currently allocated. A data area LLLL count provides a count of all sectors in the Compression Group that are currently used. A host page address 0–20 provides the most significant or high order 21 address bits used to address this compression group 38. An exception region length used count (ER L CNT) indicates the number of sectors in the exception region 42 that are currently being used. A page written count provides a count of the number of pages that have been written in this compression group. Compression group statistics 84 include a flags field for predefined control flags.

Check field 86 is calculated as even parity vertically on a 32 bit word basis over all entries prior to it in the micro table. Check field 86 is provided for error checking of the directory field entries. Reserved/Unused field is not used.

FIG. 3 illustrates a definition of the compression header 58 of the invention that enables recovery of the directory when lost. The method of the invention used to perform directory recovery is illustrated and described with respect to FIGS. 4A, 4B, 5A and 5B.

In FIG. 3, compression headers 58 are illustrated based on sizes for each field that relate specifically to an IBM AS/400 implementation; however, the field sizes are easily modified to address larger or smaller domains as needed. A feature of the invention is that the number of DASD compression directory updates and controller generated DASD operations can be drastically reduced by using the compression headers 58 to rebuild directory information. Compression headers 58 are written during system write operations.

Compression headers 58 include a drive write count (DWC) field 90. DWC 90 is used as a timestamp, so that old data is easily distinguished from current data. DWC 90 is a unique 36 bit number for each DASD 36. DWC 90 is incremented with each write operation to that device 36. This DWC number is monotonically increasing, does not wrap, and is a sequence stamp for each page. The drive write count 90 serves as the mechanism to distinguish between current valid data and old, invalid data. Each time a compression group 38 is allocated on DASD 36, the current DWC 90 is stored.

A number (#) of sectors field 92 is a 4-bit number that indicates the total number of sectors used to store this compressed page, i.e. 1=1, 2=2, . . . , 9=9. Values 0, A–F are invalid.

A write length indicator (WLI) field 94 defines the spatial span over which the current DWC 90 is valid. The DWI 94 allows the desired data to be written, while placing a clear indication of the unwritten or old and invalid pages, directly on the DASD 36. Without the combination of the WLI 94 and the DWC 90, fragments of old data within a compression group 38 must be continually cleared by the storage controller generated operations to the DASD 36. The WLI 94 is used when recovering micro table directories 44. The WLI 94 is an 8-bit field that specifies the span in units of pages over which the DWC 90 for a given page is valid. Valid values for WLI 94 are from 1–J or 0–255 for this example. WLI 94 is defined as the number of unwritten or exception pages that follow this page. WLI 94 is zero in the exception region 42.

A page offset (PO) field 96 specifies to which of the pages within a compression group 36 that this sector belongs. A header generation field (IOP) 98 is used to indicate an input/output processor generated header or a storage management header; where zero represents a storage management header, and one represents a controller header. A deallocated (DEAL) field 100 is used to indicate the status of the first page of an extent. The DEAL field 100 is a single bit that is valid for each sector of the first page of an extent, and where one indicates that the page and those pages covered by the WLI are deallocated. A reserved (RSVD) field must be 0. A sector sequence number (#) (SSN) 102 is a 4-bit field that identifies the sector's location within a compress page, for example, 1=first, 2=second, ... 9=ninth. Values of Hex A through Hex F are used to indicate directory structures.

The number of sectors 92, page offset 96, DEAL 100, and sector sequence SSN 102 are provided in the compression header 58 to enable clear and precise reclamation of valid sequences of DASD sectors into compressed pages.

Referring now to FIGS. 4A, 4B, 5A and 5B, there is shown a flow chart illustrating logical steps performed by a storage controller 22 of FIG. 1 for rebuilding directory information for compressed data on DASD 36 in accordance with the present invention. In the event of the loss of directory information, either from the physical directory cache, or due to a sector error reading the data from DASD 36, the directory is recovered using the directory rebuild method of the invention. When recovery is required, the illustrated steps are used for each compression group 38.

In FIG. 4A, the sequential steps begin at a block 400. Referring also to FIG. 6, an exemplary working micro table (MT) structure as illustrated. First the working MT is initialized with all LLLL fields as 0 and the AAAA fields set to the minimum AAAA size as indicated at a block 402. Next a sector header working table (SHWT) is initialized as indicated at a block 404. The working table is setup for each page with space for the following information contained in each sectors' compression header 58 that comprise the page including the drive write count 90, the write length indicator 94, the sector sequence number 102, and the number of sectors 92.

Each sector is read starting at the beginning of the compression group 38. The sectors are read sequentially 0 through n as indicated at a block 406. The contents of compression header 58 are used to identify valid sequences of sectors that constitute pages, and to ignore those sectors that contain old or deallocated data, and rebuild a comparable micro table 44. A page resolution sequence is performed starting with checking the drive write count. It is determined whether the DWC 90 is equal to or greater than the compression group drive write count (CGDWC), and equal to or greater than the DWC 90 of any previously identified pages with a write length indicator 94 that spans this potential page as indicated at a block 408 labeled IS (DWC>=CGDWC AND DWCcur>=DWCm with WLI that spans this page?) cur>m>0. Next the sector sequence number SSN 102 is checked looking for a progression starting at 1 as indicated at a block 410 labeled IS SSN=1? When this is true, the start of a potentially valid page has been detected. If the SSN is not equal to one, then a check is made to determine whether all compression group sectors have been read as indicated at a block 412. Next the DEAL bit 100 is checked as indicated at a block 414 labeled IS DEAL=0?

Referring to FIG. 4B, when determined at block 414 in FIG. 4A that the DEAL bit 100 is equal to 0, indicating valid pages, then the next sector (cur+1) is read as indicated at a block 416. When the DEAL bit 100 equals 1, indicating that this page can be marked as deallocated, then using the page offset, this page and those pages spanned by the WLI 94 are marked as deallocated in the MT with sectors distributed between them as desired as indicated at a block 418.

Next it is determined whether the SSN 102 is sequential and the DWC 90 is valid for the sector read at block 416 as indicated at a block 420. If not, then the sequential operations return to block 408 in FIG. 4A. When an invalid sequence is detected, then the corresponding sectors are assumed to be unwritten and can be distributed between either written or unwritten pages as desired.

Otherwise, when SSN 102 is sequential and the DWC 90 is valid; then the SSN 102 is compared with the number of sectors (NS) 92 as indicated at a block 422. When determined at block 422 that the SSN is greater than the number of sectors NS 92, then the sequential operations return to block 412 in FIG. 4A. The sequential operations continue with reading subsequent sectors, using the SSN 102 and the NS 92 to validate a correct sequence. When determined at block 422 that the SSN is equal to the number of sectors NS 92, then using the page offset, AAAALLLL entry is written in the MT as indicated at a block 424. When determined at block 422 that the SSN is less than the number of sectors NS 92, then it is determined whether all compression group sectors have been read as indicated at a block 426. If all compression group sectors have been read then the sequential operations continue with the sequential steps of FIG. 5A. Otherwise, the sequential operation returns to block 416 reading subsequent sectors. After the AAAALLLL directory entry is written at block 424, then the WLI 94 is validated in the sector header working table SHWT as indicated at a block 428. Next it is determined whether all compression group sectors have been read as indicated at a block 430.

Figure 5A:
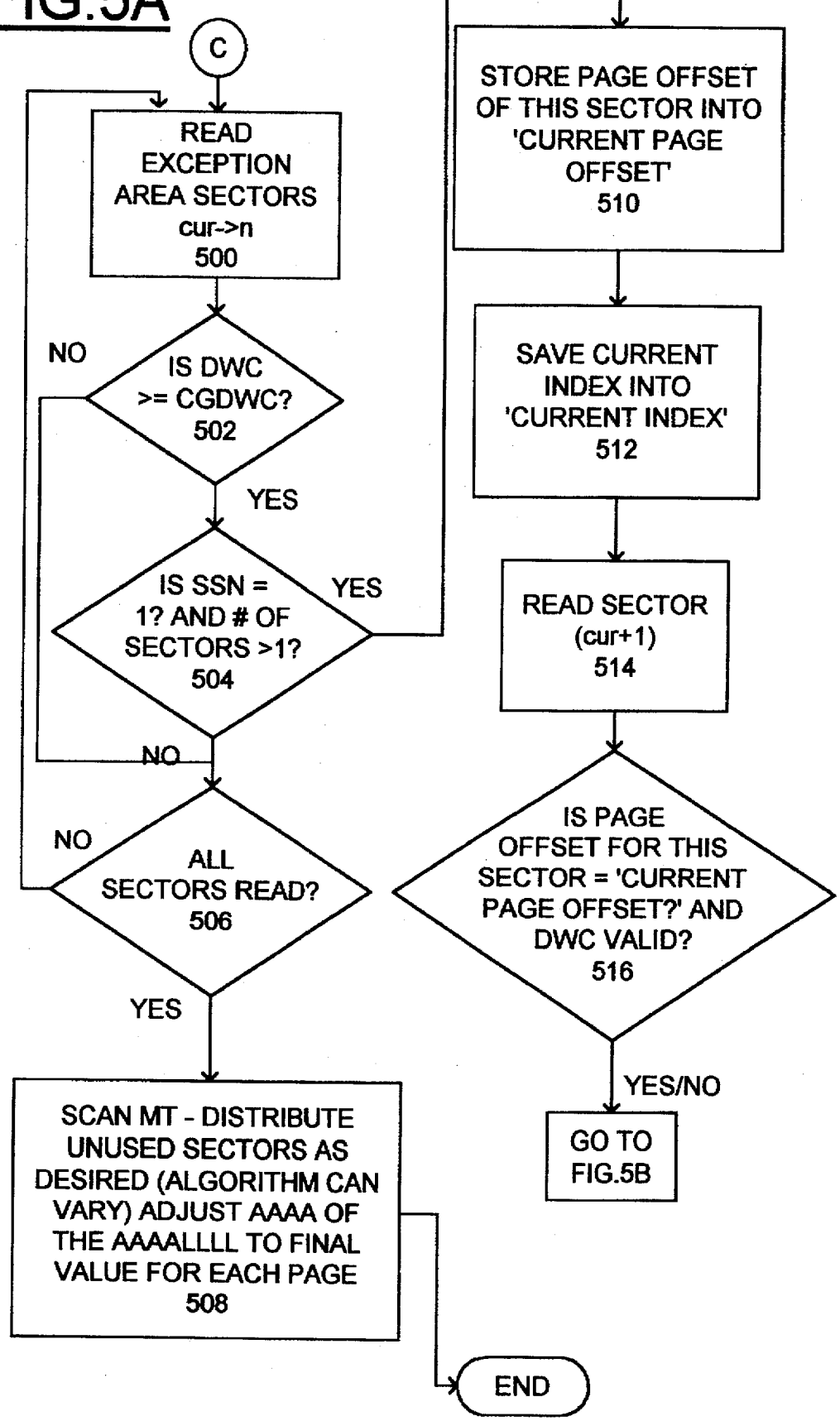
Figure 5B:
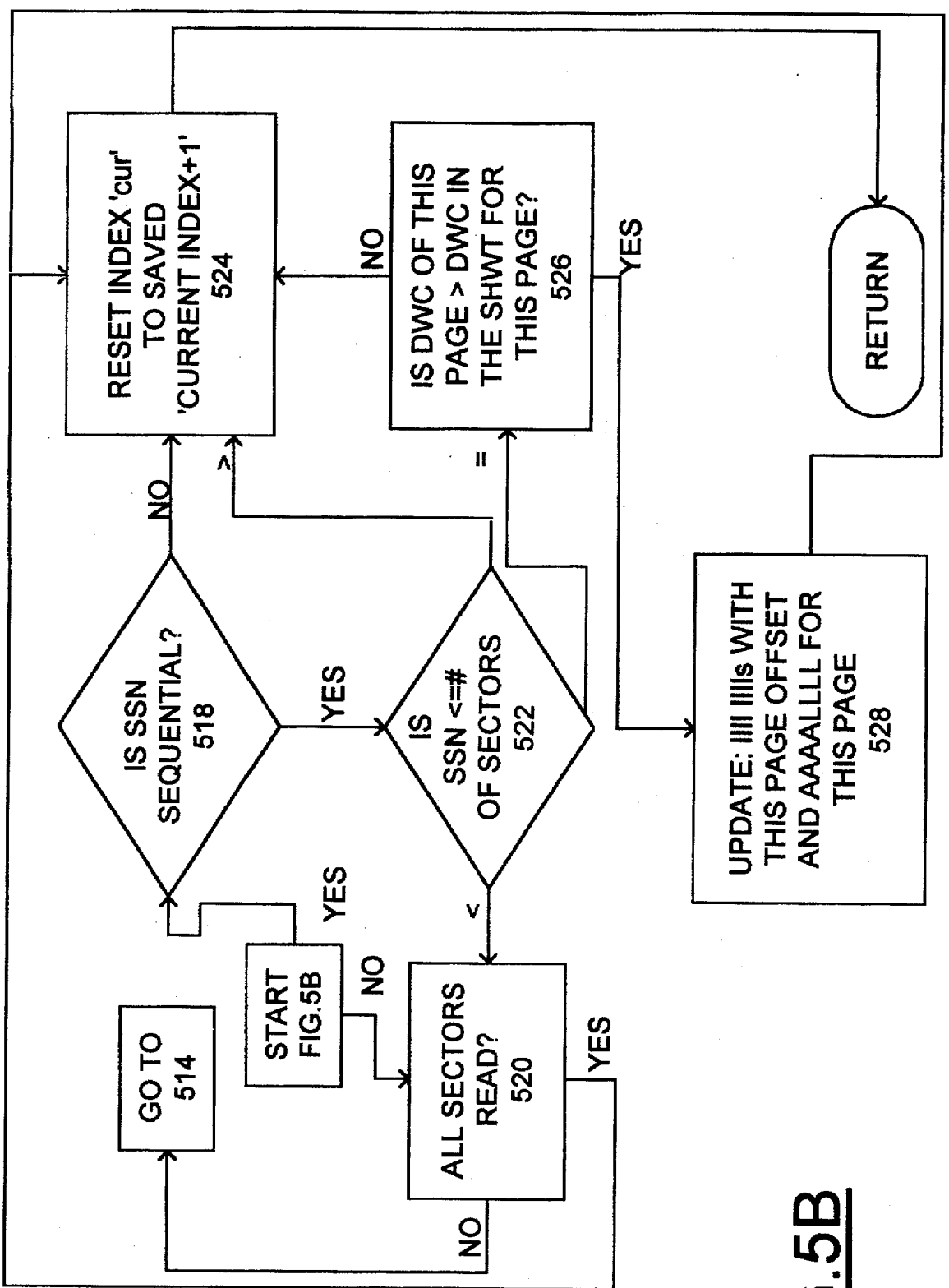

Referring now to FIGS. 5A and 5B, the sequential steps continue following entry point C with reading the exception area sectors current through n as indicated at a block 500. The exception area 42 is read looking for valid pages. It is determined whether the device write count DWC 90 is greater than or equal to the compression group DWC (CGDWC) as indicated at a block 502. If the DWC 90 is greater than or equal to the CGDWC, then it is determined whether the SSN 102 is equal to 1 and the number of sectors SN 92 is greater than 1, as indicated at a block 504. Otherwise, when the DWC 90 is less than the CGDWC, then checking whether all EXCP region sectors have been read is done as indicated at a block 506. If all sectors have not been read, then the sequential steps continue returning to block 500. Otherwise, when all sectors have been read; then the MT is scanned and unused sectors are distributed as desired and the micro table is adjusted as required. AAAA of the AAAALLLL is adjusted to the final value for each page as indicated at a block 508. Various algorithms can be used at block 508; however, it should be ensured that the distribution of sectors in the data area matches the placement of actual data, for example, if there are spare sectors in the data adjacent to a page where the most recent data is located in the exception area, spare sectors are not distributed in the exception page such that the AAAALLLL values would not indicate data in the exception area.

Otherwise, when determined at block 504 that the SSN 102 is equal to 1 and the number of sectors SN 92 is greater than 1; then the page offset 96 of this sector is saved into 'current page offset' as indicated at a block 510. Next the current index is stored into 'current index' as indicated at a block 512. The subsequent sector (cur+1) is read as indicated at a block 514. Next checking whether the page offset for this sector equals the 'current page offset' and that DWC is valid, is provided, as indicated at a block 516.

Referring now to FIG. 5B, when determined at block 516 of FIG. 5A that the page offset for this sector equals the 'current page offset' and that DWC is valid, then a check is made to determine whether the SSN 102 is sequential as indicated at a block 518. Otherwise, when determined either that the page offset for this sector does not equal a 'current page offset' or that DWC is not valid, then it is determined whether all EXCP region sectors have been read as indicated at a block 520. If determined that SSN is sequential at block 518, then the SSN 102 is compared with the number of sectors SN 92 as indicated at a block 522. When determined at block 522 that the SSN is greater than the number of sectors NS 92, then the index is reset to the saved 'current index+1' as indicated at a block 524 For each detected page, the drive write count value is checked to determine if the same page was identified in the data area and the most current is used. When determined at block 522 that the SSN is equal to the number of sectors NS 92, then it is determined whether the DWC of this page is greater than the DWC in the SHWT for this page, as indicated at a block 526. If true, then the directory exception region entries 82 or IIII IIIIs are updated with this page offset, and the page entry 80 or AAAALLLL is updated for this page as indicated at a block 528. When determined at block 522 that the SSN is less than the number of sectors NS 92, then it is determined whether all EXCP region sectors have been read at block 520. If all sectors have not been read, then the sequential steps continue returning to block 514 in FIG. 5A. After the updating has been performed at block 528 and after it is determined that all sectors have been read at block 522, then the index is reset to the saved 'current index+1' at block 524.

In brief summary, the directory rebuild method and compression header 58 of the invention provide a vastly simplified mechanism on the part of the storage controller 22 to manage and preserve the physical directory required for the storage of compressed data on DASD 36. Volatile Memory can be used on the controller 22 as a cache for the physical directory information, rather than significantly more expensive non-volatile memory.

Another advantage of the invention is that when updates are made to DASD, either as a result of directory cache management or at system shutdown time, the update can be made directly to one location on DASD, without the need to synchronize the update of mirrored locations, for reliable operation in the event of failures during the operations. In general, the need to provide synchronous DASD directory updates is completely removed since recovery is provided based upon the contents of the compression headers 58. This is particularly important in the compression environment since directory entries change much more frequently than in a traditional subsystem without compression. For example, directory entries change when the compressed page sizes change as well as when the compressed page location moves.

Another advantage of the invention is that controller generated operations to zero old data are virtually eliminated. The net result when comparing the DASD write operations for a compressed DASD and a non-compressed DASD is about a one-to-one correlation. Thus performance degradation is substantially prevented with the method for maintaining directory information for the compressed data.

In general, the disclosed directory rebuild method can be applied to any non-volatile storage medium where a directory is required to facilitate the random access and update of the stored compressed data. Examples of such include FLASH memory arrays, other devices, such as optical, and compressed system memory arrays. While the present invention has been described as used in system 10, it should be understood that the directory rebuild method of the invention advantageously may be used to minimize the complex task of managing space within other systems that manage space on a variable page size basis.

While the present invention has been described with reference to the details of the embodiments of the invention shown in the drawing, these details are not intended to limit the scope of the invention as claimed in the appended claims.

What is claimed is:

1. An apparatus for maintaining and rebuilding directory information for compressed data on a direct access storage device (DASD) of a type including addressable sectors for storing data comprising:

a storage controller; said storage controller including means for storing a directory of written compressed data; means for writing directory information to the DASD; and means for compressing data to provide at least one compressed data page; means for reading and writing compressed data to the DASD with a compression sector header including;

drive write count means for counting each compressed data page write operation and each directory write operation to the DASD and for providing a drive write count;

number of sector means for identifying a number of sectors in a compressed data page for said drive write count;

write length indicator means for identifying a span for said compressed data page for said drive write count;

page offset means for identifying a page offset for said identified number of sectors in said compressed data page; and deallocation means for identifying a status of a first page of an extent; said extent being a block of sequential compressed data pages; said compression sector header being written for each compressed data page write operation to the DASD and including said drive write count, said identified number of sectors, said identified page offset and said identified status.

2. An apparatus as recited in claim 1 wherein said drive write count is a unique count value that is incremented with each compressed data page write operation and each directory write operation.

3. An apparatus as recited in claim 1 wherein said write length indicator means defines a number of unwritten pages that follow said compressed data page.

4. An apparatus as recited in claim 1 wherein said DASD includes a plurality of compression groups; each compression group including a predetermined number of pages and said page offset defines one of said predetermined number of said pages.

5. An apparatus as recited in claim 1 further includes means for identifying a sector sequence number for each of said identified number of sectors in said compressed data page for said drive write count.

6. An apparatus as recited in claim 1 further includes means for identifying said compression sector header for said directory write operation and said compression sector header for compressed data write operation.

7. A method for maintaining and rebuilding directory information for compressed data on a direct access storage device (DASD) of a type including addressable sectors for storing data using a storage controller, said method comprising the steps of:

storing a directory of written compressed data for DASD compressed data in the storage controller;

periodically writing directory information to the DASD;

compressing data to provide at least one compressed data page;

counting each compressed data page write operation and each directory write operation to the DASD and generating a drive write count;

identifying a number of sectors in a compressed data page for said drive write count for each compressed data page write operation;

identifying a sector sequence number for each of said number of sectors in said compressed data page;

identifying a span for said compressed data page for said drive write count for each compressed data page write operation;

identifying a page offset for said identified number of sectors in said compressed data page; and identifying a deallocation status of a first page of an extent; said extent being a block of sequential compressed data pages; and for each compressed data page write operation to the DASD, writing a compression sector header including said drive write count, said identified number of sectors, said identified write length indicator, said identified page offset; said identified span and said identified deallocation status; and reading compressed data from the DASD and utilizing said compression sector header for directory recovery.

8. A method for maintaining and rebuilding directory information as recited in claim 7 wherein said step of reading compressed data from the DASD and utilizing said compression sector header for directory recovery includes the steps of initializing a sector header working table; sequentially reading sectors for a compression data storage group; and utilizing a drive write count to identify a potentially valid compressed data page.

9. A method for maintaining and rebuilding directory information as recited in claim 8 wherein said step of reading compressed data from the DASD and utilizing said compression sector header for directory recovery further includes the step of identifying a sector sequence number (SSN) for a progression starting at one to identify a start of said potentially valid compressed data page.

10. A method for maintaining and rebuilding directory information as recited in claim 7 wherein said step of reading compressed data from the DASD and utilizing said compression sector header for directory recovery further includes the step of checking a deallocate (DEAL) bit to identify whether said potentially valid compressed data page is marked as deallocated.

11. A method for maintaining and rebuilding directory information as recited in claim 8 wherein said step of reading compressed data from the DASD and utilizing said compression sector header for directory recovery further includes the step of identifying a number of sectors for said potentially valid compressed data page.

* * * * *